Aug. 9, 1927.
C. M. RODGERS
1,638,215
FISHING BAIT
Filed Feb. 9, 1927
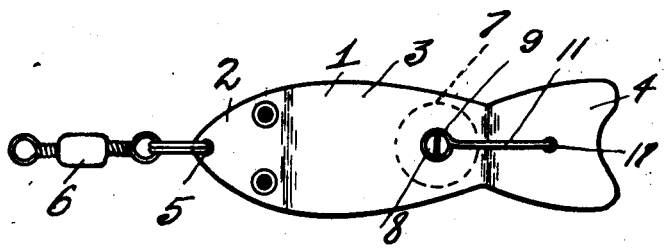
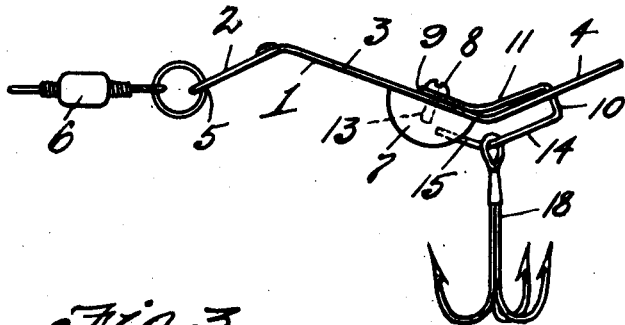
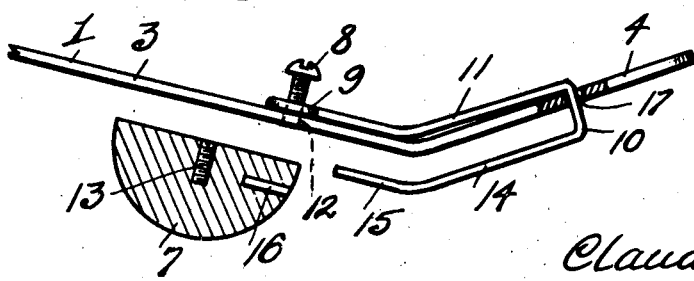
Claude M. Rodgers.
INVENTOR.
BY George J. Oltsch
ATTORNEY.

Patented Aug. 9, 1927.

1,638,215

UNITED STATES PATENT OFFICE.

CLAUDE M. RODGERS, OF SOUTH BEND, INDIANA, ASSIGNOR TO SOUTH BEND BAIT CO., OF SOUTH BEND, INDIANA, A CORPORATION OF INDIANA.

FISHING BAIT.

Application filed February 9, 1927. Serial No. 166,969.

The invention relates to fish baits, and has for its object to provide a device of this character preferably formed from sheet metal and having a downwardly and forwardly inclined forward end portion, a downwardly and rearwardly inclined central portion terminating in an upwardly and rearward extending rear portion and a weight member on the under side of the central portion adjacent its lower end, which weight member insures the submerging of the bait as it moves through the water.

A further object is to form the weight member from a convexed piece of material whereby the resistance thereof against the water, as the bait moves through the water, is reduced to a minimum for preventing the same from counteracting the action of the deflecting forward end of the body.

A further object is to secure the weight member and a hook receiving loop to the body by a single screw and to utilize a portion of the hook receiving loop for preventing rotation of the weight body, and at the same time allowing the hook to be removed from the loop by the removing of the screw and releasing of the weight and its interengagement with the loop.

A further object is to provide in combination with a bait body a weight member secured to one side of said body by means of a hook receiving loop, one end of said loop being anchored to one side of the body opposite the weight member by means of a securing member which also holds the weight and the other end of the loop cooperating with the weight whereby said weight forms a closure for the hook receiving loop.

A further object is to provide a fish bait comprising a body having a weight on one side thereof, a hook receiving loop having its arms on opposite sides of the body and extending through the body, one of said arms extending into an aperture of the weight, and a single screw extending through the other arm and into the weight and forming sole means for holding the weight against the body.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of the bait.

Figure 2 is a side elevation of the bait.

Figure 3 is an enlarged side elevation of a portion of the bait body, showing the weight in position to be assembled.

Referring to the drawing the numeral 1 designates the body of the bait, which is preferably formed from sheet metal, and is preferably flat, and 2 the forward downwardly extending portion of the bait body, which downwardly extending portion, as the bait body is drawn through the water, causes the bait to dive. The upper end of the angled portion 2 terminates in a downwardly and rearwardly inclined central portion 3, the rear end of which terminates in an upwardly and rearwardly inclined tail portion 4, and connected at 5 to the forward end of the body as a whole is a swivel 6, by means of which swivel the casting and movement of the bait may be controlled in the usual manner.

Disposed on the under side of the central portion 3 of the bait body is a weight 7, which weight is preferably adjacent the lower rear end of the central portion 3 and rearwardly of the deflecting portion 2, whereby said weight, as the bait is drawn through the water will not only cause the bait body to sink rapidly, but will form the minimum amount of resistance incident to its position behind the downwardly and forwardly inclined deflecting portion 2, and to reduce the resistance of the weight 7 to a minimum, said weight 7 is preferably convexed or otherwise stream lined. Weight 7 is secured in position by a single screw 8, which screw extends through the eye 9 of a hook receiving loop 10, and which eye 9 is carried by an arm 11 of the loop engaging the upper side of the body 1. The screw 8 also extends through an aperture 12 in the bait body, and is threaded into the threaded opening 13 of the weight 7, therefore it will be seen that a single screw is utilized for holding the weight in position as well as the hook receiving loop 10. The arm 14 of the hook receiving loop 10 is disposed below the bait body and is provided with an angularly disposed portion 15, which, when the weight body is in position, is received in the aperture 16 thereof, therefore it will be seen that the hook receiving loop will prevent rotation of the weight 7 incident to engagement with articles or obstructions, and when said weight 7 is in position, the hook 18 will be securely held on the hook receiving loop. When it is desired to remove the hook 18, for instance to replace the same with hooks of a different size, it will only be necessary for the operator to loosen the screw 8 for releasing the weight 7, thereby allowing the weight 7 to be moved forwardly until the arm 15 is out of the aperture 16, and at which time hooks can be removed from the loop 10 or placed thereon as desired. Arms 11 and 14 are preferably bent as shown to conform to the shape of the body, however it is to be understood that this may be varied if desired. The loop 10 extends through an aperture 17 in the tail portion 4, which will prevent any pivotal movement, and at the same time forms a simple structure for holding the rear end of the loop against lateral displacement. The loop as a whole may be made from relatively heavy spring material, which would allow the arms 11 and 14 to spring outwardly in relation to each other a sufficient distance for inserting the arms 15 and 14 through the aperture 17, therefore it will be seen that the bait may be easily and quickly assembled.

From the above it will be seen that a fish bait is provided wherein a weight is secured thereto by means of a single screw extending through the body of the bait and into the weight, and that the screw also secures the hook receiving loop to the body in a position whereby one of its arms engages the weight and said weight forms means for maintaining hooks on the loop, and when removed by removing the single screw allows the hooks to be placed on or removed from the hook receiving loop.

The invention having been set forth what is claimed as new and useful is:—

1. The combination with a bait body, a weight carried by said body, a hook receiving loop, of a single securing means for said loop and weight to the body, said weight forming a closure for the hook receiving loop.

2. The combination with a bait body, a weight carried by said body, a hook receiving loop, said weight forming a closure for the loop, of a single removable securing means for the weight and the loop to the body.

3. The combination with a bait body, a weight carried by one side of said body, a hook receiving loop carried by said body, said weight forming a closure for said loop, and a single removable securing means for securing said loop and weight to the body.

4. The combination with a bait body, a weight carried by one side of said body, a hook receiving loop adjacent said weight and interengaged therewith whereby the weight will form a closure for the loop, one arm of said loop engaging the side of the body opposite the weight, and a removable securing means extending through said arm, body and into the weight.

5. A fish bait comprising a relatively flat body, a weight engaging the under side of said body, a hook receiving loop, said loop having spaced arms disposed on opposite sides of the body, one of said arms cooperating with the weight, the other arm engaging the opposite side of the body, and a securing screw extending through said last named arm, the body and into the weight.

6. A fish bait comprising a body, a weight engaging the under side of said body, a hook receiving member, spaced arms carried by said hook receiving member and disposed on opposite sides of the body, one of said arms extending into an aperture in the weight and adapted to receive hooks, the other arm engaging the upper side of the body, and a screw extending through said last named arm, the body, and into the weight.

7. A fish bait comprising a body, a weight engaging the under side of said body, a hook receiving member, spaced arms carried by said hook receiving member and disposed on opposite sides of the body, one of said arms extending into an aperture in the weight and adapted to receive hooks upon removal of the weight, the other arm engaging the upper side of the body, a screw extending through said last named arm, the body and into the weight, said hook receiving member extending through an aperture in the body, spaced from the screw.

8. The combination with a fish bait, a weight carried by the under side thereof, of a hook receiving loop, said loop being anchored to the upper side of the bait and extending through an aperture in the bait, a single securing means for the loop and weight, said loop cooperating with the weight for preventing rotation of the weight, said weight also forming a closure for the loop.

9. The combination with a fish bait having a downwardly and forwardly inclined portion and a downwardly and rearwardly inclined portion, of a weight secured to the under side of the downwardly and rearwardly inclined portion substantially rearwardly of the downwardly and forwardly inclined portion.

10. The combination with a fish bait having a downwardly and forwardly inclined portion, a downwardly and rearwardly inclined portion, of a forwardly convexed weight secured to the underside of the downwardly and rearwardly inclined portion, said weight being disposed substantially rearwardly of the downwardly and forwardly extending portion.

In testimony whereof I affix my signature.

CLAUDE M. RODGERS.